Figure 1:
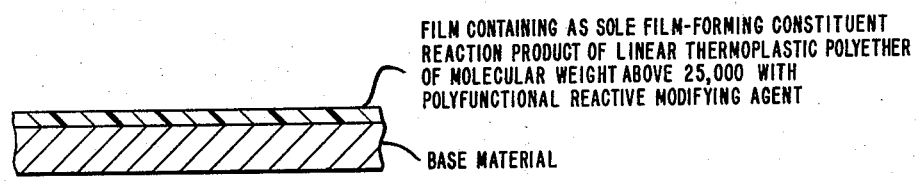

INVENTORS:
ROBERT E. BAYES
JOSEPH P. MANASIA

BY: *Martin S. Baer*

THEIR ATTORNEY

United States Patent Office 3,177,090
Patented Apr. 6, 1965

3,177,090
BASE COATED WITH A LINEAR
THERMOPLASTIC POLYETHER
Robert E. Bayes and Joseph P. Manasia, Union, N.J.,
assignors to Shell Oil Company, New York, N.Y., a
corporation of Delaware
Filed Apr. 19, 1961, Ser. No. 104,015
20 Claims. (Cl. 117—72)

This invention relates to coatings formed from certain polyether resins.

The coatings of this invention are formed from unique polyether resins which are products of the condensation of substantially equimolar parts of di-vic-epoxides having the epoxide groups in terminal positions in the molecule and dihydric phenols; the polyether resins are characterized by a substantially linear structure, a high molecular weight and high impact resistance.

Said polyether resins, which are the basic materials used in the compositions of this invention, may be prepared from the same reactants as epoxy resins known to the art. Conventional epoxy resins are prepared by reacting polyepoxides with curing agents, the reaction resulting in opening of the epoxide rings and formation of highly cross-linked thermoset resins, herein called "cured epoxy resins." The polyepoxides which are the starting materials for the production of conventional cured epoxy resins are sometimes themselves referred to as epoxy resins and will be herein designated "uncured epoxy resins."

The polyether resins which are basic materials in the compositions of this invention are clearly distinguished from both uncured and cured epoxy resins by their physical characteristics and chemical structure. The uncured epoxy resins are characterized by a molecular weight which is lower by an order of magnitude than the molecular weight of said polyether resins. For example, the highest weight average molecular weight of polyepoxides commercially produced for conversion to epoxy resins is about 15,000, compared with weight average molecular weights of 25,000 to 1,000,000 or more for said polyether resins. Uncured epoxy resins are not satisfactory for use as coatings or adhesives unless they are reacted with a curing agent to cause a high degree of cross-linking while the polyether resins used in the invention have excellent coating and adhesion properties without any further chemical modification.

The distinction between the polyether resins used in this invention and cured epoxy resins lies in their different chemical structure, the former being substantially linear thermoplastic resins and latter cross-linked thermoset resins.

The distinction between polyether resins which have been reacted with modifying chemicals according to this invention and cured epoxy resins is one of structure as well as properties. The resins of this invention have a very high molecular weight and contain at most two epoxy groups per molecule, both in terminal positions. At least part of the terminal groups generally are phenolic. Thus, cross-linking by attack on the epoxy groups would not be very effective in providing a useful network structure. However, the polyether resins are adapted to reaction with compounds which attack the secondary hydroxyl groups, thus providing cross-linking at intervals of the chain.

The polyepoxides which are the starting materials for thermoset epoxy resins of the prior art and for the polyether resins used in this invention can be made from identical materials, e.g., epichlorohydrin and p,p'-bisphenol A. The explanation of the difference in the resulting products lies in the reaction conditions. Well known conditions for making polyepoxides usable for producing epoxy resins are illustrated in U.S. 2,467,171 to Werner et al. and 2,651,589 to Shokal et al. The conditions for making polyether resins used in this invention are described in copending Serial No. 46,387, filed August 1, 1960, by R. L. Maycock et al., now abandoned, and in a continuation-in-part thereof.

Maycock et al. were concerned with the production of a resin suitable for manufacture by compression molding or extrusion into parts in which high impact resistance is a necessary property. It has now been found that the same resins can be converted to coatings of outstanding toughness, adhesion and abrasion resistance which have excellent hardness, flexibility and chemical resistance. These coatings are suitable for use on a great variety of base materials. A number of modifications of this invention are hereinafter described in which said polyether resins are combined with various reactive modifiers and other ingredients for the preparation of suitable protective or decorative coatings.

Particularly uncommon and advantageous properties of the coatings of this invention are their unusually high abrasion resistance, combined with great hardness, flexibility and unusually high adhesion to metals. High abrasion resistance and high hardness are an uncommon combination in coating resins. The metal adhesion of these coatings is superior to that of most, if not all, thermoplastic resins. Their adhesion to other plastics is also very good. Thus, these resins are especially suitable for use as primers.

It is an object of this invention to provide novel surface coatings characterized by excellent adhesion, flexibility, toughness, abrasion resistance, hardness and resistance to chemicals. It is another object to provide novel transparent, clear or colored, surface coatings for metals. Another object is to provide novel primers for vinyl and acrylic resin top coats. Another object is to provide pigmented primer and enamel compositions for application to metals and metal articles coated therewith. Numerous other objects of this invention will be apparent from the following description thereof.

Figure 2:
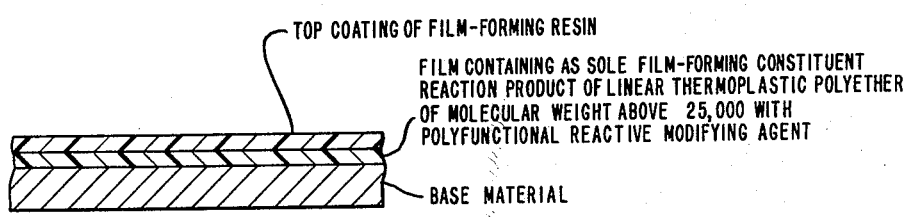

The invention is illustrated by a drawing in which FIG. 1 represents a section through a base material coated with a coating according to this invention, comprising as sole film-forming constituent the reaction product of a linear thermoplastic polyether with one of certain emulsifying compounds as described in greater detail below; FIG. 2 represents a section through an article consisting of a base containing as a first or primer coat a film of the same type of polyether composition, and as top coat a film of a film-forming resin, such as further described below.

Unmodified polyether resins of this invention provide satisfactory coatings for many purposes. However, it has now also been found that improved compositions having superior properties in certain applications are provided when the resins are combined with various polyfunctional (this includes di-functional) compounds which are capable of interacting with the alcoholic hydroxyl groups of the polyether resins and exposed to conditions at which the reaction can take place, e.g., heating.

One of the problems overcome by the use of such reactive modifiers is stress cracking of coatings. Stress cracking consists of the development of cracks in the coatings at some period after an initial application of conditions which place the coating under stress, such as bending.

Another problem overcome by the addition of reactive modifiers is deterioration of various properties of can coatings under severe conditions of contact with boiling water or steam.

It was found that coatings for tinplate, prepared at conditions such as used in producing cans for foodstuffs and beverages, were adversely affected by severe steaming or boiling conditions. However, inclusion of moderate amounts of a reactive modifying ingredient in the liquid coating composition, ultimately followed by baking of the coating, served to produce coatings having excellent properties under these severe tests. The perspiration resistance of brass finishes is similarly improved by inclusion of reactive modifiers.

MATERIALS UTILIZED IN THIS INVENTION

Polyether resins

The resins utilized in this invention are substantially linear polyether condensation products of substantially equimolar parts of dihydric phenols and diepoxides, having certain characteristic properties including high impact resistance when tested in the form of molded shapes. They can be obtained by reacting diepoxides and dihydric phenols in solutions of low water content under controlled conditions, as described in detail in copending patent application Serial No. 46,387, filed August 1, 1960, by R. L. Maycock et al., now abandoned. The methods of preparation will be referred to only to the extent required for understanding of this invention.

"Epoxide" herein refers exclusively to vicinal epoxide grouping or oxirane ring

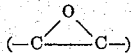

Resins suitable for use in this invention are characterized by a relatively high molecular weight. A useful measurement indicative of molecular weight of resins is "intrinsic viscosity" (I.V.). Unless otherwise indicated, all values of I.V. given herein are in units of dl./g. and are based on measurements in dimethoxyethane (DME). The polyether resins used in this invention generally have an I.V. in the range from 0.3 to 1.0. This corresponds approximately to weight average molecular weights of 50,000 to 1,000,000. A particularly preferred resin has an I.V. of 0.39, corresponding to a weight average molecular weight of about 200,000.

Particularly useful polyether resins for use in this invention are produced by the reaction of 2,2-bis(4-hydroxyphenyl)-propane and the diglycidyl ether thereof, namely 2,2-bis(2,3-epoxypropoxyphenyl)propane. The phenolic compound is often referred to in industry as "p,p'-bisphenol A"; technical grades of the named compound are generally referred to simply as "bisphenol A." These terms are at times used herein for convenience of reference. Similarly, the diglycidyl compound may conveniently be designated "diglycidyl ether of p,p'-bisphenol A."

In lieu of the pure diglycidyl ether of bisphenol A, there may be used a commercial reaction product of bisphenol A and epichlorohydrin which contain about 70% to 80% of the diglycidyl ether of bisphenol A, the remainder being diepoxides which are higher condensation products. This product typically is a viscous liquid having a weight average molecular weight of about 350 and an epoxide value of 0.50 epoxide equivalent per 100 grams. Its preparation is described in U.S. 2,633,458 under "Polyether A."

Another particularly useful polyether resin is produced by reacting bisphenol A with a mixture of diepoxides produced as the condensation product of bisphenol A with epichlorohydrin, said mixture being characterized by a weight average molecular weight of about 900, a Durrans' Mercury Method melting point of about 70° C. and an epoxide value of about 0.20 epoxide equivalent per 100 grams. This is described as "Polyether D" in U.S. 2,633,-458 to Shokal.

In general, preferred polyether resins are produced by reacting bisphenol A with the reaction products of epichlorohydrin and bisphenol A produced, for example, as described in said Shokal patent and having molecular weights from 340 to 2,000. This includes polyethers A through E of said patent.

The description of this invention will be made in substantial part by reference to the product prepared from bisphenol A and its diepoxide derivatives. Satisfactory results can also be obtained, however, with resins from other phenolic compounds and diepoxides, and particularly from certain other bisphenols and their diglycidyl ethers.

Starting compounds suitable for preparing the thermoplastic polyether resins used in this invention are enumerated in detail in said application of Maycock et al. Preferred phenols may be represented by the general formula

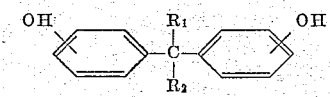

in which $R_1$ and $R_2$ when taken collectively with the connector carbon C are from the group consisting of cyclohexyl and alkyl-substituted cyclohexyl, and when taken separately are from the group consisting of hydrogen, alkyl- cyclohexyl, phenyl and alkyl substituted cyclohexyl and phenyl groups and their halogen derivatives, with the total number of carbon atoms in the group or groups attached to said connector carbon atom not exceeding eighteen and the number of carbon atoms in any of said alkyl substituent groups not exceeding six. The preferred phenols have the hydroxyl groups in the 4,4' positions, but compounds with hydroxyls in the 2,2', 3,3', 2,4', and other arrangements may also be used. $R_1$ and $R_2$ suitably are methyl, ethyl, isobutyl, n-nonyl, n-heptadecyl and the like.

Other dihydric phenols may also be employed, excepting those which have two hydroxyl groups in ortho position on a single benzene ring.

The second reactant in the condensation process, the diepoxide, is a compound having two 1,2-epoxide groups in terminal positions in the molecule. Suitable diepoxides are terminal diepoxyalkanes, e.g., 1,2-epoxy-5,6-epoxyhexane and the like. Others are terminal diepoxides containing ether linkages, such as bis((2,3-epoxypropyl)ether; diglycidyl ethers of alpha,omega glycols such as the diglycidyl ether of ethylene glycol; and diglycidyl ethers of dihydric phenols. Reaction products containing mixtures of related diepoxides of different molecular weights can be used.

The condensation reaction between a dihydric phenol and a diglycidyl ether of a dihydric phenol to produce the desired thermoplastic polyether resins requires the presence of a basic condensation catalyst. The catalyst may be added, for example, as a concentrated aqueous solution of sodium or potassium hydroxide or a quaternary ammonium hydroxide or it may be added as anhydrous ammonia or an amine or a sodium or ammonium salt of a phenol, e.g., of the same dihydric phenol which is used as a reactant. When the catalyst is added as an aqueous solution, a concentrated solution is used since it is not desirable to have more than a small amount of water present in the reaction mixture.

The concentration of catalyst present during the condensation reaction is held to a very low value, usually 0.04 to 0.75 percent by weight of the total reactants, and preferably between 0.08 and 0.20 weight percent. It is useful to add initially an extra amount of catalyst, sufficient to react with any impurities, such as saponifiable chlorine, to prevent slowing down of the reaction.

The water content of the reaction mixture is maintained below 1 percent by weight. While it is preferred to keep it as low as possible, concentrations below 0.5 percent by weight are generally satisfactory.

Careful control of the ratio of dihydric phenol and diglycidyl ether in the reaction mixture is of great importance in order to obtain a product having the desired characteristics. When technical grades of one or several reagents are employed, the correct ratio is maintained by determining the epoxy equivalence and the phenolic hydroxide equivalency of the reagents. Reaction mixtures should contain not less than 0.980 and not more than 1.025 vicinal epoxide groups

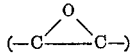

per phenolic hydroxide group.

The reaction is carried out in solution in a solvent or mixture of solvents which: (1) is capable of maintaining reactants and reaction products in solution, at reaction temperatures, in the concentrations employed, (2) does not react significantly with epoxide groups or phenolic hydroxyl groups, and (3) has a boiling point such that the reaction can be carried out at 75° to 150° C. at a practical pressure.

Methyl ethyl ketone is a preferred solvent. Other solvents which meet these criteria are, for example, certain other ketones, halogenated hydrocarbons and ethers, e.g., methyl isobutyl ketone, cyclohexanone, chloroform, 1,2-dichloroethane, dioxane, tetrahydrofuran, dimethoxyethane, lower alkyl (methyl or ethyl) ethers of ethylene glycol and benzyl alcohol, or mixtures of benzene with acetone.

The following describes one preferred method for producing the polyether resins used in this invention. Numerous modifications can be made in this method. A suitable solvent, e.g., methyl ethyl ketone, is placed in a reaction vessel. A dihydric phenol and a diglycidyl ether of a dihydric phenol are added in precisely measured amounts, such that the ratio of epoxide groups to phenolic hydroxide groups is in the range from 0.980:1.000 to 1.025:1.000. The concentration of the reactants in methyl ethyl ketone is preferably in the range from 20% to 60% by weight, most preferably from 35% to 45%. A basic catalyst is added to the mixture. The reaction mixture is brought to a desired reaction temperature, suitably between 75° and 150° C. and maintained at that temperature with agitation until a condensation product of a desired intrinsic viscosity has been produced.

The reaction mixture may then be diluted with solvent, cooled and washed with sufficient water to remove at least most of the salt formed in the catalyst neutralization. The washing step at this stage is not essential if the resin is subsequently recovered by precipitation in a large volume of water.

The reaction mixture may be stabilized by removing all solvent by heating under vacuum, if desired, but this step is found to be not essential. If the reaction mixture was stabilized, it is redissolved in a suitable solvent. In the production of high impact resistant resin, it is preferred to have a solution of the condensation product formed in the reaction step and to recover the resin from solution by rapid and complete removal of solvent from the resin.

In the production of resin solutions suitable for use in the present invention the washed solution of resin and the reaction solvent may be directly employed without prior precipitation of the resin, or the resin may be precipitated and then again placed in solution in a suitable solvent.

*Solvents*

The above-described polyether resins are soluble in a variety of conventional solvents of relatively high polarity, i.e., those known as "strong solvents." Solutions of the resins may be prepared utilizing a single compound as solvent but are generally prepared with a mixture of solvents to provide the desired solubility for not only the resin but other ingredients of the composition and the desired volatility for the intended use. Useful solvents are selected from the group consisting of oxygen-containing and halogen-containing organic compounds and a few miscellaneous types. Suitable solvents include, for example: methyl ethyl ketone, cyclohexanone, mesityl oxide, diacetone alcohol, dioxane, dimethoxyethane, tetrahydrofuran, methyl ether of diacetone alcohol, 4-methoxy-4-methyl pentanone-2 ("Pentoxone"), diethylene glycol mono-n-butyl ether, ethylene glycol monomethyl ether (methyl "Cellosolve"), ethylene glycol monomethyl ether acetate, ethylene glycol monoethyl ether acetate ("Cellosolve" acetate), dichloromethane, chloroform, dimethylsulfoxide and dimethylformamide. Liquids which are not in themselves solvents for the polyether resins may be employed in admixture with some of the useful highly polar solvents in order to provide, for example, mutual solubility with other ingredients. For this reason, it is sometimes desirable to add to the strong solvent a hydrocarbon solvent such as an aromatic compound, e.g., toluene or xylene, or a paraffinic solvent such as a high-boiling naphtha.

The high molecular weight of the polyether resins causes them to be soluble in many instances only in higher concentrations. For example, mixtures of a preferred polyether resin and methyl ethyl ketone are homogeneous solutions at concentrations above about 22-24 percent by weight resin, but a separate resin phase is present at substantially lower resin concentrations at room temperature. In general, polyfunctional oxygenated compounds, such as ether alcohols, ether esters or ether ketones provide the broadest solubility ranges. For example, the preferred resins of this invention are soluble in all concentrations in ethylene glycol monoethyl ether acetate and in 4-methoxy-4-methyl pentanone-2. Solvent mixtures containing at least 20 percent of one of said compounds are particularly advantageous. Such solvent blends generally provide solubility to infinite dilution.

*Modifying ingredients*

*Reactive modifiers.*—It has been found that improved coating compositions can be prepared by the addition of minor proportions of various di- or polyfunctinal compounds which are capable of interacting with the alcoholic hydroxyl groups of the polyether resins. Such reactive modifiers may be used in amounts sufficient to react with 1 to 100% of the alcoholic hydroxyl groups.

*Aminoplasts.*—A preferred group of reactive modifiers consists of the so-called aminoplasts. These are, broadly, the condensation products of various amines and amides with aldehydes. Most typical and most preferred for use in this invention are the condensation products of urea and formaldehyde and of melamine and formaldehyde. These are available as commercial products. Other aminoplast condensation products are produced from thiourea and various substituted ureas and urea derivatives and from substituted melamines such as benzoguanamine. Various other amines and amides can similarly be reacted with formaldehyde, etc., to form condensates. Thus other aminotriazines and aminodiazines will react with aldehydes to form condensates. Many of the commercial resins prepared by the reaction of urea or melamine or both with aldehydes are prepared in the presence of alcoholic or other solvents which may take part in the reaction and become an integral part of the resulting resin composition. These known aldehyde condensates with ammonia derivatives are aminoplasts suitable for use in this invention.

*Phenolic resins.*—Condensation products of various phenols with formaldehyde can be used as reactive modifiers in the compositions of this invention. These products are well known to the art. Typically useful condensation products of this type are those of formaldehyde with phenol, cresols and xylenols. The types useful in this invention are the base-catalyzed resins known as resols or A-stage resins and resitols or B-stage resins.

*Methylol resins.*—These resins are phenol-formaldehyde reaction products of relatively low molecular weight, e.g., 150–200, characterized by their methylol groups. A typical representative is the commercial resin sold as "Methylon" by the General Electric Company.

*Isocyanates.*—Another group of compounds which can be effectively included in compositions of this invention to provide modification of the coatings are those having two or more isocyanate groups (—NCO groups). Typical of the most generally available compounds of this type are 2,4-tolylene diisocyanate and 2,6-tolylene diisocyanate and their mixtures. Other available diisocyanates are 1,5-naphthylene diisocyanate, 4,4'-diphenylmethane diisocyanate and 1,4-phenylene diisocyanate. A triisocyanate which may be used is, for example, 4,4',4''-triphenylmethane triisocyanate. The reaction product of isocyanates with triols or mixed polyols, which have a lower volatility, can be employed such as the product of tolylene diisocyanate with trimethylol-propane which is commercially available. Blocked polyisocyanates can also be employed. Typical of these are the phenol blocked triisocyanates which are phenolurethanes of di- or triisocyanates.

Isocyanates are added to compositions of this invention in amounts ranging from 1 to 100%, based on available alcoholic hydroxyl groups of the polyether resin, and preferably from 25 to 100%. The unblocked isocyanates are simply added to the solution of the polyether resins. The reaction of the isocyanate groups and the alcoholic hydroxyls or the polyether resins will take place at room temperature or at the elevated temperatures employed in baking of the coatings.

*Anhydrides.*—Organic or inorganic acid anhydrides may be added to the compositions of this invention to provide modification of the resulting coatings. Typical of the inorganic anhydrides is phosphorus pentoxide and typical of the organic anhydrides is trimellitic anhydride. Numerous other anhydrides can be employed to serve the same purpose. The anhydrides are suitably added to an anhydrous solution of polyether resin in a suitable solvent. The resulting coatings require baking at temperatures of about 200° C.

*Diepoxides.*—The addition of suitable diepoxides to compositions of this invention provides coatings having improved solvent resistance. Suitable diepoxides are any of those enumerated above as useful for the production of the polyether resins of this invention. The epoxides are used to provide from 0.01 to 1 epoxy group per alcoholic hydroxyl group of the resin. Reaction is accomplished by admixing the linear resin, the diepoxide and a catalyst of the type employed for curing of epoxy resins. These catalysts may be acidic or basic and are well known to the art. Caustic or organic amines are preferred in the compositions of this invention. Depending on the activity of the catalyst a greater or lesser degree of heating of the coating is required in order to provide the required amount of reaction.

Other ingredients

Ingredients which are conventionally employed in thermoplastic coating and adhesive compositions may also be employed in many instances in the compositions of this invention with some beneficial effect. The following are typical of such ingredients:

*Conventional plasticizers.*—While not all conventional plasticizers are compatible with the polyether resins used in this invention, the following are typical of those which are compatible; where whole groups are mentioned some members of the group may be found incompatible while others are compatible. They may be added, if desired, although in the compositions of this invention they do not appear to provide any special advantages: diallylphthalate, dioctylsebacate, dibutylphthalate, butylbenzylphthalate, polyalkylene glycols, polyvinyl formals, polyesters, chlorinated biphenyls, hydrogenated rosins, rosin esters, triaryl phosphates such as triphenyl phosphate and tricresyl phosphate, trialkyl phosphates such as tributyl phosphate, and the like.

*Ultraviolet screening agents.*—Ultraviolet screening agents can be suitable added to the compositions of this invention. It is found that addition of agents such as orthohydroxylbenzophenones and carbon black results in coatings which have greatly improved facility for preventing rusting on steel objects coated with such compositions. These ingredients are incorporated into the coating solution merely by stirring them into the solution. They may be present in concentrations from 0.01 to 5 phr. (parts per 100 parts resin).

*Fillers.*—Inorganic or organic extenders such as silica, titanium dioxide, wood flour, asbestos, sawdust, etc., can be added to the compositions of this invention in concentrations from 1 phr. to 1000 phr. The resulting slurries or pastes are suitable for use as sealants and fillers.

*Dyes.*—Color can be provided for the compositions of this invention either by addition of dyes or the addition of pigments. Oil soluble dyes are in general, suitable. Typical useful dyes are for example, crystal violet, alizarin and cyanine green. The dyes may be added directly or in solution to the coating solutions containing the linear resins according to this invention. The dyes have no measurable adverse effect on resin properties when used at concentrations up to 1 phr. The use of clear solutions of the polyether resin together with dyes results in beautiful decorative coatings for bright metal work. For example, aluminum coated in this manner appears much like a very glossy anodized aluminum.

*Pigments.*—The addition of pigments to compositions of this invention results in a substantial improvement in the rate of solvent release from the coatings, and hence in quick establishment of strong adhesion of the resulting coating. Typical pigments suitable for use in this invention include for example red iron oxide, the various forms of titanium dioxide, lead oxide, lead chromate, zinc oxide, magnesium silicate, calcium carbonate and calcium plumbate. Zinc chromate, a desirable rust preventing ingredient, can be incorporated in the compositions of this invention whereas it is not suitable for use in pigmented compositions prepared from conventional epoxy resins because it reacts with the usually required amine curing agents. Pigments are used in concentrations which are conventional in the paint art, e.g., in ranges from 1 to 40 percent.

Substrates for coatings

The coatings of this invention can be applied to a great variety of bases or substrates. Included in these are all structural metals such as steel, brass, aluminum, tin plate and the like and a variety of non-metallic surfaces such as various kinds of wood, glass, ceramics and thermoplastic and thermoset synthetic resins such as epoxy-, acrylic- and vinyl resins.

In order to provide an adhesive coating it is ordinarily only required that the surface be cleaned in the same manner otherwise used for the application of paints or protective coatings.

PRIMERS AND BASE COATS

The excellent adhesion of coatings according to this invention to various metallic and non-metallic substrates makes them particularly useful as bases for thin coatings of other resins and as primers for various paints. When used as bases for other resins, ordinarily thin clear coatings of the resins of this invention are applied. Thus the adhesion of the coatings of this invention to conventional resins such as epoxy, acrylic and vinyl resins is generally utilized in reverse fashion by applying those various types of resins to a coating of the resin of this invention on a substrate such as metal, glass, wood or the like. The resins of this invention are particularly suitable in the preparation of can coatings where strong adhesion to the metal surface of the can is required. A final top coat of a resin such as conventionally applied by the can manufacturer, e.g., a vinyl resin, can then be coated on the base coat prepared according to this invention.

The excellent adhesion, toughness and chemical resistance of the resins of this invention is also a particularly desirable property in primer paints for use on appliances, automobiles and the like. These primer paints are generally pigmented compositions. They will be further illustrated by specific examples.

METHODS OF APPLYING COATINGS

In the application of coatings utilizing the compositions of this invention a distinction can be made between those methods in which the coating composition contains solvents and those in which it contains only the resin itself, and possibly other modifying ingredients such as pigments, fillers, plasticizers and the like. The former will be referred to herein as wet methods and the latter as dry methods.

Dry methods

It has been found that coatings according to this invention can be successfully laid down by the following dry methods which are known to the art. In the "fluidized bed" technique the article to be coated is heated to a temperature above the melting point of the resin but below the point at which the article itself is adversely affected by temperature, and the heated article is dipped into a fluidized bed of powdered resin. The fluidization of the bed is suitably effected by a continuous stream of air distributed through the resin powder. The article is withdrawn after a predetermined period of immersion and is cooled. Films varying in thickness from 5 to above 20 mils can be applied in a single dip. The preheating temperatures required to provide the proper sintering of the resin and film flow properties depend on the type of substrate employed, the mass of the article, its heat conductivity and resin composition. It has found to vary from a minimum temperature of about 350° F. to a maximum of about 600° F. Objects thus coated provide good electrical insulation properties and resistance to chemicals. As has been explained above, it is particularly preferred to include a suitable polyalkylene glycol in their composition to permit operation at the lower temperatures in this range.

In another dry method the powdered resin is sprayed onto a preheated substrate.

In another dry method the powdered resin is applied by flame technique, i.e., a stream of the powdered resin is applied to the article through or with a flame which heats the resin above its melting temperature.

In another dry method of application the resin is applied by electrostatic deposition.

Wet methods

Solutions of the polyether resins can be applied as coatings in any of the conventional methods for applying such coatings, e.g., by spraying, including conventional hot, warm, airless, steam, and electrostatic spraying, by brushing, dipping or flow methods. Any of these may be either cold, warm or hot.

Solutions of the polyether resin can be emulsified and applied by the same conventional methods as referred to in connection with solution coatings.

In a further modification the coatings of resins according to this invention may be applied by preparing the resin in the form of a plastisol or of an organosol.

The conditions required for reaction between polyether resins and reactive modifiers depend on the type of modifier added. For example, isocyanates will react even at room temperature. The phenoplasts, aminoplasts and generally the epoxides, will react at elevated temperatures, e.g., about 250° F. and above. The times shown above as suitable for baking at temperatures in this range are sufficient to provide the desired degree of reaction.

Where the coating according to this invention is used as a primer, the cross-linking reaction may take place prior to or during the baking of the top coat. Thus, the coating may be force dried in a relatively brief time, the top coat applied, and the total coating then baked.

The invention will be further illustrated by means of the following examples. It will be understood that these examples are only for the purpose of furnishing a better understanding of this invention and of showing preferred embodiments thereof and are not to be considered a limitation of this invention.

EXAMPLE 1

Polyepoxide resin is prepared as follows: To methyl ethyl ketone in a stainless steel kettle one adds a sufficient amount of a commercial grade of bisphenol A and of a commercial grade of condensation product of epichlorohydrin and bisphenol A, containing 70 to 80% of the diglycidyl ether of p,p'-bisphenol A, to produce a 40% by weight solution of reactants. The ratio of the reactants is 1.0:1.0 epoxide to phenolic hydroxyl equivalent. Catalyst is 0.02 mol of sodium hydroxide per mol of bisphenol A, added as a 45% w. aqueous solution. The reaction is carried out at 120° C. and terminated by addition of excess carbon dioxide after the desired viscosity is attained. The crude product solution is washed twice with one half volume of methyl ethyl ketone saturated with water, serving to reduce the sodium hydroxide content of the resin below 0.1 milliequivalent per 100 grams resin. The resin is recovered from solution by precipitation with cold water under rapid agitation. After centrifuging to remove excess water, the wet resin shreds are dried in a forced draft oven at 80–90° C. for at least 24 hours. In a typical preparation according to this method, the resin product properties shown in Table 1 are observed:

*Table 1*

| | |
|---|---:|
| Intrinsic viscosity | 0.37 |
| Epoxide, eq./100 g. | 0.005 |
| Phenolic hydroxyl, eq./100 g. | 0.012 |
| Alkalinity, meq./100 g. | 0.04 |
| Secondary hydroxyl, eq./100 g. | 0.33 |
| Methyl ethyl ketone, percent w. | 0.08 |
| Water, percent w. | 0.8 |
| Total chlorine, percent w. | 0.03 |
| Inorganic chloride, percent w. | 0.0035 |
| Ash, percent w. | 0.02 |
| Heat, distortion temperature (264 p.s.i.), ° C. | 89 |
| Vicat softening point, ° C. | 100 |
| Impact strength, notched Izod, ft.-lb./in. notch (average) | 1.4 |
| Impact strength, unnotched Izod, ft.-lb./in. (average) | 93 |

The chemical resistance of a series of specimens prepared from a resin prepared in this manner is tested by immersing molded discs, 0.125 inch thick and two inches in diameter, in various solvents and reagents for seven days at 25° C. (ASTM method D545–56T). The samples exhibit excellent resistance toward caustic soda, acids and some solvents. No chemical degradation is observed in any of the tests; however, in some instances swelling is found. The data are summarized as follows:

Excellent resistance (no change in thickness or width; weight gain less than 0.4%):

| | |
|---|---|
| Sulfuric acid (10 and 30% w.) | Sodium chloride (10% w.) |
| Nitric acid (10% w.) | Hydrogen peroxide (8% w.) |
| Sodium hydroxide (3 and 10% w.) | Ethanol (50% vol.) |
| | Carbon tetrachloride |
| | Heptane |

Fair resistance (weight, width, and thickness gain, each less than 5%):

Ethanol (95%)   Phenol (5%)

Poor resistance (5–10% gain in weight): Toluene.

No resistance (physical structure of disc destroyed):
Acetone   Ethylene chloride

EXAMPLE 2

A solution which serves as a concentrate for the preparation of various clear and pigmented coatings is prepared by dissolving dried, shredded resin of Example 1 in methyl ethyl ketone to produce a solution containing 40% solids. The properties shown in Table 2 are typical of such a solution.

*Table 2*

| | |
|---|---|
| Solution viscosity at 25° C. _____poises__ | 200 |
| Solution color, Gardner _____ | 2 |
| Solution weight per gallon _____pounds__ | 7.75 |

EXAMPLE 3

A formulation which is particularly advantageous for preparation of various lacquers and paints is prepared by adding to 50 parts of the solution of Example 2 60 parts of ethylene glycol mono-ethyl ether acetate and 10 parts of toluene. The resulting solution then has the composition shown in Table 3.

*Table 3*

| | Parts |
|---|---|
| Polyether resin | 15 |
| Methyl ethyl ketone | 22.5 |
| Ethylene glycol monoethyl ether acetate | 60 |
| Toluene | 10 |
| | 107.5 |

A solvent blend consisting of the same proportions of the three solvents is suitable for use as a thinner for such compositions.

EXAMPLE 4

Another formulation can be prepared by adding to 50 parts of the resin solution of Example 2 ethylene glycol monoethyl ether acetate, methyl isobutyl carbinol and toluene to produce a solution having the composition shown in Table 4.

*Table 4*

| | Parts |
|---|---|
| Polyether resin | 20 |
| Methyl ethyl ketone | 30 |
| Ethylene glycol monoethyl ether acetate | 20 |
| Methyl isobutyl carbinol | 20 |
| Toluene | 30 |
| | 120 |

For these solutions, thinner suitably is made with the same properties of solvents.

EXAMPLE 5

To 107.5 parts of the solutions of Example 3 there is added 0.6 part of a commercial phenolformaldehyde resin. The resulting clear solution has the composition shown in Table 5.

*Table 5*

| | |
|---|---|
| Polyether resin | 15 |
| Phenolic resin | 0.6 |
| Methyl ethyl ketone | 22.5 |
| Ethylene glycol monoethyl ether acetate | 60 |
| Toluene | 10 |

This composition is applied to tinplate under conditions utilized in commercial can manufacturing. 0.2–0.4 mil films on 0.25 lb. electrolytic tin plate, after baking 1–2 minutes at 425° F., show excellent fabrication properties and excellent resistance to pasteurization, sterilization and steam processing. Similar coatings prepared from substantially identical formulations, but without the phenolic resin have substantially inferior resistance to pasteurization, sterilization and steamprocessing.

The composition of Table 5 is modified by changing the amount of phenolic resin to 0.375 in one case and to 1.2 in another case. Satisfactory coatings are similarly produced from these formulations.

EXAMPLE 6

Example 5 is repeated, substituting an equal weight of a commercial melamine resin ("Cymel 254–8," American Cyanamid Co.) for the phenolic resin. Similarly good results are obtained.

EXAMPLE 7

Example 5 is repeated, substituting an equal weight of a commercial methylol resin ("Methylon," General Electric Co.) for the phenolic resins. Similarly good results are obtained.

EXAMPLE 8

The solvent composition of Example 4 is substituted for that of Example 3. Examples 5–7 are repeated with this modified solvent composition, with similarly satisfactory results.

EXAMPLE 9

The resin preparation of Example 1 is repeated with the following diphenols and diepoxides.

(a) Bis(4-hydroxyphenyl)methylphenylmethane and diglycidyl ether of bisphenol A;
(b) Bis(4-hydroxyphenyl)methylphenylmethane and the diglycidyl ether thereof;
(c) Bisphenol A and bis(2,3-epoxypropoxyphenyl)-methylphenylmethane;
(d) Bis(4-hydroxyphenyl)methane and diglycidyl ether of bisphenol A;
(e) 1,1-bis(4-hydroxyphenyl)ethane and diglycidyl ether of bisphenol A;
(f) 2,2-bis(4-hydroxyphenyl)butane and diglycidyl ether of bisphenol A;
(g) bis(4-hydroxyphenyl)diphenylmethane and diglycidyl ether of bisphenol A;
(h) Bisphenol A and diepoxybutane;
(i) Bisphenol A and 1,2-epoxy-7,8-epoxyoctane;
(j) Bisphenol A and diglycidyl ether of ethylene glycol.

Solutions are prepared from the resulting reaction products in accordance with Example 2, and these solutions are blended with solvents according to Examples 3 and 4, to produce compositions suitable for use in preparing coatings as illustrated in Examples 5–8. Useful coatings are prepared from these compositions by the illustrated methods.

EXAMPLES 10–19

A number of samples of coated metal are prepared with solutions made by adding to the composition of Example 3 various amounts of different modifying resins. The compositions and bake schedules are shown in Table 6.

Table 6

| Examples | Materials | Parts | Percent Stoich. | Parts | Percent Stoich. | Parts | Percent Stoich. |
|---|---|---|---|---|---|---|---|
| 10–12 | Urea-Formaldehyde Resin [a] | 17 | 20 | 7.5 | 10 | 3.8 | 5 |
|  | Polyether resin | 300 |  | 300 |  | 300 |  |
| 13–15 | Urea-Formaldehyde Resin [b] | 17 | 20 | 7.5 | 10 | 3.8 | 5 |
|  | Polyether resin | 300 |  | 300 |  | 300 |  |
| 16–18 | Methylol Resin [c] | 9.1 | 20 | 4.5 | 10 | 2.3 | 5 |
|  | Polyether resin | 300 |  | 300 |  | 300 |  |
| 19 | Polyether resin alone |  |  |  |  |  |  |

| | Bake Schedule Time (minutes) | Temperature (° F.) |
|---|---|---|
| 10–12 | 30 | 300 |
| 13–15 | 30 | 300 |
| 16–18 | 15 | 400 |
| 19 | 30 | 450 |

[a] Commercial resin "Uformite F 240" (60% non-volatile).
[b] Commercial resin "Uformite MX 61" (60% non-volatile).
[c] Commercial resin "Methylon-75108" (100% non-volatile).

It is found that the control sample (Example 19) shows a severe degree of "blush" in a standard sterilization test, while the degree of blush in Examples 13 and 16 is very slight and in Examples 10–12, 14–15 and 17–18 is slight.

EXAMPLES 20–22

Solutions are prepared by adding reactive modifiers to a solution containing 15 parts of a resin according to Example 1 in a solvent containing methyl ethyl ketone, ethylene glycol monoethyl ether acetate and toluene in the ratio 6:3:1. The compositions are shown in Table 7.

Table 7

| Example No. | 20 | 21 | 22 |
|---|---|---|---|
| Polyether solution (15% nvm.) | 97.5 | 97.5 | 95.0 |
| Melamine-formaldehyde resin [a] | 2.5 |  |  |
| Urea-formaldehyde resin [b] |  | 2.5 | 5.0 |
|  | 100.0 | 100.0 | 100.0 |

[a] Commercial resin "Cymel 245-8" (50% nvm.).
[b] Commercial resin "Uformite F 240" (60% nvm.).

The coatings are thinned to can-coating viscosity with ethylene glycol monoethyl ether acetate, sprayed on tinplate at a thickness of 0.2–0.3 micron and baked 10 minutes at 375° F. Can ends are fabricated and tested in acidified copper sulfate. All three are found to have excellent fabricating properties. Fabricated and unfabricated pieces are tested for steam processing at 30 minutes, 70 minutes and 145 minutes. All parts prepared according to Example 20 are satisfactory. All parts prepared according to Examples 21 and 22 are satisfactory after 30 minutes. All fabricated parts according to Example 21 are satisfactory after 70 and 145 minutes. All parts according to Example 22 are satisfactory after 70 minutes, but there is loss of adhesion on one spot after 145 minutes.

By contrast, can ends prepared from similar polyether resin solutions without addition of a reactive modifier failed the tests by water spotting and loss of adhesion.

EXAMPLE 23

Coatings are prepared by adding to a solution of polyether resin such as shown in Example 2 sufficient trimellitic anhydride to react with 25 percent of the alcoholic hydroxyl groups of the resin. The solution is applied to a suitable surface and baked at 200° F. The result is a hard, clear, glossy film with improved solvent resistance.

EXAMPLE 24

Phosphorus pentoxide is substituted for the trimellitic anhydride in Example 23. Similar improvement is obtained.

EXAMPLE 25

Tolylene diisocyanate is added to a solution of polyether resin such as shown in Example 2, in an amount sufficient to react with 25 percent of the alcoholic hydroxyl groups of the resin. The solution is applied to a suitable surface. Clear, hard, glossy films are obtained by drying at room temperature and by baking at up to 200° C.

Methods suitable for preparing the polyether resins employed in preparing the coatings of this invention are further illustrated by Examples 26 and 27.

EXAMPLE 26

Resin is prepared from a mixture of 99.7% pure p,p'-bisphenol A and substantially 100% pure diglycidyl ether of p,p'-bisphenol A. The catalyst employed is the monosodium salt of p,p'-bisphenol A in a concentration of 0.04 mol per mol of bisphenol. The reactants are employed in a ratio of 1.00 mol of the ether per 99.96 mols of free bisphenol, in 30% by weight solution in methyl ethyl ketone. The reaction is carried out for 6.5 hours at 120° C.

Resin produced in this manner has a melting range of approximately 140–160° C. and an intrinsic viscosity of 0.4 dl./g., measured in dimethoxyethane. Its viscosity average molecular weight is greater than 100,000. When the procedure is modified by increasing the reaction time, resins having a high intrinsic viscosity, up to 1.1 and melting range up to 300° C. are produced.

EXAMPLE 27

The following method is suitable for production of polyether resin on a larger scale. A mixture of a dihydric phenol and diglycidyl ether in a molar ratio of 1.00 to 1.00 is prepared in solution in a suitable solvent such as methyl ethyl ketone. The reactant concentration is suitably 40% by weight. As catalyst there is used 0.02 mol sodium hydroxide per mol of dihydric phenol, added in the form of 45% aqueous solution. The reaction mixture is placed in a closed vessel having reflux means and sampling means and is brought to a temperature of 120° C. The viscosity of the reaction mixture is determined on samples which are taken either continuously or periodically; commercially available viscosity determining apparatus is used. The viscosity of the reaction mixture at any given time can be correlated with the intrinsic viscosity of the resin produced up to that time. For this purpose one employs a calibrating curve, conveniently produced in known manner from a series of preliminary small scale laboratory tests. When the viscosity of the reactant solution has reached a value which corresponds to the desired intrinsic viscosity of the product, the reaction is stopped by adding sufficient carbon dioxide to the reaction mixture to neutralize the sodium hydroxide present. $CO_2$ is conveniently added by merely pressuring the required amount into the gas space of the reactor and permitting the stirring action to carry it into the reaction mixture.

In a series of illustrative experiments the desired intrinsic viscosity was 0.30 and the actual intrinsic viscosities of the resins produced in this manner varied by no more than 0.02 units from the target value. The reaction times required to produce the desired resin range from 4.8 to 5 hours.

We claim as our invention:

1. A base coated with a flexible, tough, continuous, strongly adhering film containing as sole film-forming constituent the reaction product of (1) a substantially linear thermoplastic polyether condensation product of substantially equimolar parts of a terminal di-vic-epoxide and a dihydric phenol, characterized by a substantial excess of non-epoxy end groups over epoxy end groups, a weight average molecular weight above 25,000, and complete solubility in ethylene glycol monoethyl ether acetate, with (2) from 1 to 100% of a stoichiometrically equivalent amount, based on the content of secondary aliphatic hydroxyl groups in said polyether condensation product, of a polyfunctional reactive modifying agent capable of reacting with said hydroxyl groups and selected from the group consisting of aminoplasts, base-catalyzed phenol-formaldehyde condensation products, methylol resins free of amino groups, organic isocyanate compounds having at least two —NCO groups per molecule, inorganic acid anhydrides, organic acid anhydrides, and diepoxides, said reaction product having been formed after deposition of the film-forming ingredients on said base.

2. A base coated with a flexible, tough, continuous, strongly adhering film containing as sole film-forming constituent the reaction product of (1) a substantially linear thermoplastic polyether condensation product of substantially equimolar parts of 2,2-bis(4-hydroxyphenyl) propane and a mixture of diepoxides produced by reacting 2,2-bis(4-hydroxyphenyl)propane with epichlorohydrin, said mixture having a number average molecular weight in the range from 340 to 3000, said thermoplastic polyether being characterized by a substantial excess of non-epoxy end groups over epoxy end groups, a weight average molecular weight above 25,000, and complete solubility in ethylene glycol monoethyl ether acetate, with (2) from 1 to 100% of a stoichiometrically equivalent amount, based on the content of secondary aliphatic hydroxyl groups in said polyether condensation product, of a polyfunctional reactive modifying agent capable of reacting with said hydroxyl groups and selected from the group consisting of aminoplasts, base-catalyzed phenol-formaldehyde condensation products, methylol resins free of amino groups, organic isocyanate compounds having at least two —NCO groups per molecule, inorganic acid anhydrides, organic acid anhydrides, and diepoxides, said reaction product having been formed after deposition of the film-forming ingredients on said base.

3. An article according to claim 2 in which said polyether has an intrinsic viscosity of at least about 0.3 dl./g., measured in dimethoxyethane.

4. An article according to claim 2 in which said modifying agent is a fusible phenol-formaldehyde condensation product and said reaction is carried out at a temperature of at least about 250° F.

5. An article according to claim 2 in which said modifying agent is a methylol resin free of amino groups and said reaction is carried out at a temperature of at least about 250° F.

6. An article according to claim 2 in which said modifying agent is a urea-formaldehyde condensation product and said reaction is carried out at a temperature of at least about 250° F.

7. An article according to claim 2 in which said modifying agent is a triazine-formaldehyde condensation product and said reaction is carried out at a temperature of at least about 250° F.

8. An article according to claim 2 in which said modifying agent is a melamine-formaldehyde condensation product and said reaction is carried out at a temperature of at least about 250° F.

9. An article according to claim 2 in which said modifying agent is a di-vic-epoxide condensation product and said reaction is carried out at a temperature of at least about 250° F.

10. An article according to claim 2 in which said modifying agent is an organic acid anhydride condensation product and said reaction is carried out at a temperature of at least about 200° F.

11. An article according to claim 10 in which said acid anhydride is trimellitic anhydride.

12. An article according to claim 2 in which said modifying agent is an inorganic acid anhydride condensation product and said reaction is carried out at a temperature of at least about 200° F.

13. An article according to claim 12 in which said anhydride is phosphorus pentoxide.

14. An article according to claim 2 in which said modifying agent is an organic diisocyanate and said reaction is carried out at a temperature in the range from room temperature to 200° C.

15. An article according to claim 2 in which said base is a metal.

16. An article according to claim 2 in which said modifying agent is an organic diisocyanate and said reaction is carried out at about room temperature.

17. An article according to claim 16 in which said organic diisocyanate is tolylene diisocyanate.

18. A composite article comprising a base, a tough continuous strongly adhering primer coating on said base containing as sole film-forming constituent the reaction product of (1) a substantially linear thermoplastic polyether condensation product of substantially equimolar parts of a terminal di-vic-epoxide and a dihydric phenol, characterized by a substantial excess of non-epoxy end groups over epoxy end groups, a weight average molecular weight above 25,000, and complete solubility in ethylene glycol monoethylether acetate, with (2) from 1 to 100% of a stoichiometrically equivalent amount, based on the content of secondary aliphatic hydroxyl groups in said polyether condensation product, of a polyfunctional reactive modifying agent capable of reacting with said hydroxyl groups and selected from the group consisting of aminoplasts, base-catalyzed phenol-formaldehyde condensation products, methylol resins free of amino groups, organic isocyanate compounds having at least two —NCO groups per molecule, inorganic acid anhydrides, organic acid anhydrides, and diepoxides, said reaction product having been formed after deposition of the film-forming ingredients on said base, and a top coating of a different film-forming resin.

19. An article according to claim 18 wherein said polyether is the condensation product of 2,2-bis(4-hydroxyphenyl)propane and a mixture of diepoxides produced by reacting 2,2-bis(4-hydroxyphenyl)propane with epichlorohydrin, said mixture having a number average molecular weight in the range from 340 to 2,000.

20. An article according to claim 19 in which said different film-forming resin is selected from the group consisting of vinyl and acrylic resins.

(References on following page)

References Cited by the Examiner

UNITED STATES PATENTS

| | | | |
|---|---|---|---|
| 2,592,560 | 4/52 | Greenlee | 260—47 |
| 2,602,075 | 7/52 | Carpenter et al. | 260—47 |
| 2,615,008 | 10/52 | Greenlee | 260—47 |
| 2,824,855 | 2/58 | Freeman et al. | 260—47 |
| 2,871,219 | 1/59 | Baggett et al. | 260—2 |
| 3,008,848 | 11/61 | Annonio | 117—75 |

OTHER REFERENCES

"Paint Manufacture," vol. 26, No. 5, May 1956, pp. 157–162 and p. 176.

"Modern Plastics," vol. 33, No. 8, April 1956, pp. 174, 176, 274 and 276.

"Official Digest," vol. 27, No. 360, January 1955, pp. 3–9.

"Epoxy Resins," Lee and Neville, McGraw-Hill Book Co., 1957, pages 14 and 15 and Ref. 1–6 and 1–7.

Earhart et al.: "Papers Presented at the Atlantic City Meeting," A.C.S. Div. of Paint, Plastics and Printing Ink Chem., vol. 16, No. 2, Paper 23, pages 200–216.

WILLIAM D. MARTIN, *Primary Examiner.*

RICHARD D. NEVIUS, JOSEPH REBOLD, *Examiners.*